Patented Nov. 24, 1936

2,061,829

UNITED STATES PATENT OFFICE 2,061,829

METHOD OF CONVERTING DRYING OILS TO NONDRYING OILS

Ben S. Buckmaster, Chicago, Ill., assignor to Donolac Corporation, Chicago, Ill., a corporation of Illinois No Drawing. Application April 8, 1935, Serial No. 15,259

8 Claims. (Cl. 87—12)

This invention relates to improvements in method of converting drying oils to non-drying oils.

One object of this invention is to provide a simple, relatively inexpensive, and easily controlled process for converting or modifying drying or oxidizing vegetable and animal oils so as to render the same non-oxidizing or non-drying and with other properties making them especially desirable for use in nitro-cellulose lacquers.

Another object of this invention is to provide an improved non-drying oil converted or modified from a vegetable or animal drying oil such that the converted or modified oil is substantially free from odor; is exceptionally light in color and free from pigment staining effect; that will not puff or jell when combined with any of the ordinary pigments; and which has a relatively high nitro-cellulose tolerance whereby the converted oil is particularly adapted for use in nitro-cellulose lacquers, including white and the lighter color hues.

Other objects of the invention will more clearly appear from the description and claims hereinafter following.

The invention will first be described in its broader aspects followed by specific examples to the end that those skilled in the art may better comprehend the invention.

The invention in its broader aspects relates to method or process of treating drying or oxidizing vegetable and animal oils such as linseed oil, soya bean oil, cottonseed oil, Menhaden fish oil, perilla oil, rapeseed oil, tung oil and the like. In carrying out the improved process, the raw drying oil is first reacted, under heat, with sulphur or a sulphur compound, such as $S_2Cl_2$, that will yield free sulphur at an elevated temperature. Only a relatively minute percentage of the sulphur or sulphur compound is employed, preferably within the limits of .12½ of 1% and .5 of 1% by weight. The mixture of oil and sulphur or sulphur compound is heated more or less rapidly by heat supplied from an outside source for a period varying between ten and thirty-five minutes and until the mixture reaches a temperature between the limits of 500° to 750° F. Either without any continued application of heat or after a continued application of heat for about five to twenty-five minutes, the mixture is then subjected to the passage of an inert, non-oxidizing gas therethrough, preferably $CO_2$, the gas being passed through the mixture in such manner and with such force as to thoroughly agitate the mixture and insure contact with all portions thereof by the gas and for a period varying between about five to thirty minutes. The length of the gas-blowing period may best be determined by testing the oil for viscosity and for its compatibility with the nitro-cellulose, that is, when it forms therewith a clear film free from blushing and without fogging. When its compatibility has thus been determined, the blowing of the oil with the $CO_2$ is then discontinued and the mixture or batch allowed to cool.

Specific examples of the preferred manner of carrying out the process are as follows:

(1) To 800 parts by weight of the vegetable or animal drying oil, is added one part by weight of flowers of sulphur. The mixture is then heated but without blowing for a period of twenty minutes until the temperature reaches approximately 500° F. Application of additional heat is then discontinued and $CO_2$ is blown through the mixture for approximately thirty minutes and with sufficient force to thoroughly agitate the same and subject all portions of the oil to contact with the $CO_2$.

(2) To 600 parts by weight of the drying vegetable or animal oil is added one part by weight of flowers of sulphur. The mixture, without blowing, is then heated for a period of about thirty-five minutes until the temperature reaches approximately 520° F. The latter temperature is then maintained for approximately twenty-five minutes, whereupon $CO_2$ is then blown through the mixture for a period of about thirty minutes.

(3) To 400 parts by weight of the drying vegetable or animal oil is added one part by weight of flowers of sulphur and the mixture then slowly heated, without blowing, to a temperature of substantially 625° F. The mixture is then maintained at the latter temperature for a period ranging from five to thirty minutes and thereafter $CO_2$ is blown through the mixture for a period of five to thirty minutes while continuing to maintain the temperature at about 600° F.

The exact upper temperature limit to which the oil may be heated during the sulphur treatment step will obviously vary with the particular oil being treated and as determined by its boiling point or decomposition point but, generally speaking, the limits will be within those hereinbefore specified. It is possible but not particularly practical or desirable, to blow the sulphur-treated oil with $CO_2$ at somewhat lower temperatures than those given in the preceding examples, provided the $CO_2$ blowing step is continued for a very much longer period.

As well known, when sulphur is heated with oil, it first becomes liquid and thereafter is converted to a light yellow gas and, still later, to a dark, reddish brown gas at approximately 490°, the last-named gas having a tendency to burn or oxidize if brought in contact with air or available free oxygen. Where the sulphur-treated oil has been blown with air or oxygen, it has been found that a very dark color resulted in the treated oil and with formation of a considerable amount of black carbon. With the process herein described, the drying properties of the oil are eliminated and the oil becomes more bodied through the sulphur treating step.

The exact action which takes place during the blowing of the sulphur and heat treated oil by the $CO_2$ is not known. Probably, the bubbling of the $CO_2$ through the oil acts as a mechanical agent to remove sulphur, volatile products of the oil, sulphur compounds and/or volatile products resulting from combination of the sulphur with volatile products in the oil. It is, however, reasonably certain that the $CO_2$ treatment decreases the amount of carbon-like material formed and/or removes it while being formed. Further, the use of the $CO_2$ or other equivalent inert gas eliminates danger of oxidation of the sulphur or sulphur compounds as well as possibility of explosion.

The following example illustrates the results obtainable by the use of $CO_2$ in blowing sulphur treated tung oil. An analysis for sulphur content of the raw tung oil employed indicates only a trace of sulphur of approximately 0.001%. Said raw tung oil after having added thereto 0.25% by weight of flowers of sulphur and heated for approximately 24 minutes from a temperature of approximately 70° F. to 625° F. and thereafter blown with $CO_2$ for approximately 8 minutes, showed by analysis approximately 0.019% of sulphur.

By employing the process hereinbefore described, the resultant product is found to be rendered unusually compatible with nitro-cellulose, and particularly for use in lacquers. The process minimizes undesirable odors such as heretofore present in prior processes of treating oils. The resultant product is also rendered exceptionally light in color. In the case of tung oil, for instance, the converted oil will average between 6 and 7 on the Heilige-Klett scale of varnish color grading of the American Institute of Paint & Varnish Research. The viscosity will likewise be increased and will grade between Z—1 and Z—2 on the Gardner-Holdt viscometer scale. The acid number of the tung oil will likewise be increased to an average between 8—10. Further, the resultant product possesses an increased xylol tolerance and greater solubility, thus rendering the same particularly adaptable for lacquers, and especially white and lighter tints. The product obtained by the process herein described is far superior to any of the usual raw or blown or oxygen-treated oils heretofore used for a similar purpose. When employed in lacquers, the improved product will be found to dry with a hard, smooth film exceptionally resistant to high heat, abrasion, moisture and alcohols. Further, by reason of the process employed, the improved product does not after-oxidize to an insoluble film or jell nor does the product jell during the process, thus preventing "lifting" of a coating when subsequent coats of lacquer are applied thereover. While the converted oil is especially compatible with all types of nitro-cellulose, it is particularly useful with nitro-cellulose of six seconds viscosity or above and, when used in lacquers, provides easier flow and the lacquer may be spread with several per cent. higher solid content.

In using the converted oil of the herein described process in lacquers, the same may be mixed with nitro-cellulose and an additional resin, such as ester gum or dammar gum. The relative proportions of these non-volatile ingredients of the lacquer may vary over a considerable range, dependent upon the desired ultimate characteristics and intended use. Three specific examples are here given illustrative of the proportions of the solids of such lacquers which have been found to give satisfactory results, all the following examples being with reference to the non-volatile constituents only.

Per cent by weight
(a) Cotton (nitro-cellulose) _____ 20
    Amberol 801 (malic acid hardened ester gum) _____ 40
    Converted oil of the present invention___ 40
(b) Cotton (6" viscosity nitro-cellulose) ____ 20
    Amberol 801 _____ 50
    Converted oil of the present invention___ 30

Parts by weight
(c) Cotton (½" viscosity nitro-cellulose) ____ 36
    Ester gum or other resin_____ 30
    Dibutyl pthalate_____ ½ to 1
    Converted oil of present invention_____ 24

The formula of preceding Example (a) is particularly adapted in tough furniture or brushing lacquers with a high alcohol resistance and weather-proof qualities but not particularly adapted for rubbing. The formula of Example (b) provides a furniture lacquer having an unusually clear gloss, and the formula of Example (c) a clear lacquer for furniture and more general application.

In any of the preceding formulas, a suitable plasticizing agent, such as dibutyl phthalate or tricresyl phosphate, may be employed in small percentages, although the same are not really essential.

The solvents to be used in the preparation of the lacquer employing the improved converted oil will vary particularly with reference to the manner in which the lacquer is to be applied. Where the lacquer is to be applied by brushing, a formula for the solvent that has proven satisfactory in use is as follows:

Parts by weight
Butyl acetate_____ 30
Toluol _____ 50
Turpentine_____ 10
Butyl alcohol_____ 10
Amyl acetate_____ 10

Where the lacquer is to be applied by spraying, a satisfactory solvent is obtained by the following formula:

Parts by volume
Butyl alcohol_____ 9
Butyl acetate_____ 20
Toluol _____ 53
Ethyl acetate_____ 5
Anhydrous ethyl alcohol_____ 5
Petroleum distillate (having an evaporation rate substantially the same as toluol) ____ 8

As will be evident to those skilled in the art, various changes and modifications may be made in carrying out the improved process without departing from the spirit of the invention, and all such changes and modifications are contemplated as come within the scope of the claims appended hereto. The several formulas hereinbefore given are obviously also merely illustrative, since these may also be changed and satisfactory results still obtained.

What is claimed is:

1. Process of converting a drying oil of the vegetable or animal group to a non-drying oil, which comprises: heating, by the application of heat supplied from an external source the oil with about 0.12½% to about 0.50% by weight of an agent of the group consisting of elemental sulphur and sulphur compound, to a temperature of 500° F. to 750° F.; and thereafter subjecting the so treated oil to the passage of a non-oxidizing gas therethrough to reduce the sulphur content until the product is compatible with lacquer type resins and nitro-cellulose.

2. Process as defined in claim 1 wherein the non-oxidizing gas used is $CO_2$.

3. Process defined in claim 1 wherein the oil treated is tung oil.

4. Process of converting a drying oil of the vegetable or animal group to a non-drying oil, which comprises: heating, by the application of heat supplied from an external source the oil with from about .12½% to about .50% by weight of an agent of the group of sulphur and sulphur compounds, to a temperature from about 500° F. to 750° F. and thereafter subjecting the so treated oil to the passage of $CO_2$ gas therethrough for a period of about five to thirty minutes.

5. Process defined in claim 4 wherein the heating with the sulphur agent is from about ten to thirty-five minutes.

6. Process of converting tung oil to a non-drying oil which comprises: heating the tung oil by heat supplied from an external source with more than .12½% but not in excess of .50% of an agent of the group of sulphur and sulphur compounds for a period from approximately twenty to twenty-five minutes up to a temperature of approximately 600° F.; and then subjecting the so-treated and heated oil to the passage of an inert gas therethrough to reduce sulphur content, clear the color of the oil and render the same compatible with nitro-cellulose while at the same time minimizing possibility of oxidation of the oil.

7. Process of converting tung oil to a non-drying oil which comprises: heating the tung oil with from about .12½% to about .50% by weight of flowers of sulphur from normal room temperature to a temperature of approximately 600° F. to 625° F.; and then immediately subjecting the so treated and heated oil to the passage of $CO_2$ therethrough for a period of approximately 5 to 10 minutes.

8. A process of converting tung oil to a non-drying oil as defined in claim 6, wherein the inert gas passed through the treated and heated oil consists of $CO_2$.

BEN S. BUCKMASTER.